United States Patent [19]
Neuman

[11] Patent Number: 6,104,100
[45] Date of Patent: Aug. 15, 2000

[54] CHARGE TRANSFER LOAD SENSOR

[75] Inventor: David Raymond Neuman, Randolph, Minn.

[73] Assignee: Sheldahl, Inc., Northfield, Minn.

[21] Appl. No.: 09/014,026

[22] Filed: Jan. 27, 1998

[51] Int. Cl.[7] ................................................. B60R 21/32
[52] U.S. Cl. ........................ 307/10.1; 180/273; 280/734; 307/121; 340/436; 340/666; 361/179; 364/528.4; 701/45
[58] Field of Search ..................................... 307/9.1, 10.1, 307/121, 109, 116, 119; 361/181, 179, 283.1–283.4, 277; 340/436, 666; 327/517; 701/45–47, 29, 36; 29/407.09; 364/528.4; 280/274, 279, 282, 734; 180/272–274, 279, 282, 290

[56] References Cited

U.S. PATENT DOCUMENTS

| | | | |
|---|---|---|---|
| 5,232,243 | 8/1993 | Blackburn et al. | 180/273 |
| 5,506,454 | 4/1996 | Hanzawa et al. | 180/272 |
| 5,869,751 | 2/1999 | Bonin | 361/283.2 |
| 5,900,592 | 5/1999 | Sohns et al. | 361/277 |
| 5,957,491 | 9/1999 | Cech et al. | 180/273 |

*Primary Examiner*—Albert W. Paladini
*Attorney, Agent, or Firm*—Merchant & Gould P.C.

[57] ABSTRACT

A charge transfer load sensor. A first and second electrode are disposed a fixed distance apart, and a third electrode is disposed between the first and second electrodes. The third electrode is grounded and its position between the first and second electrodes varies in response to an applied force. A switch arrangement applies a predetermined voltage level to the first electrode and couples the second electrode to ground during a first predetermined timing interval. During a second predetermined timing interval, the first electrode is coupled to the second electrode to transfer the charge of a first capacitor formed by the first and third electrodes to a second capacitor formed by the second and third electrodes. An output port coupled to the second electrode provides an output voltage as a function of the applied force.

23 Claims, 9 Drawing Sheets

CHARGE TRANSFER LOAD SENSOR

FIELD OF THE INVENTION

The present invention is generally related to charge transfer sensors, and more particularly, to a charge transfer sensor for detecting loads having varying weights.

BACKGROUND OF THE INVENTION

Single-capacitor load sensors are generally known in the art. Such single-capacitor load sensors generally include a pair of electrodes that form a capacitor whose capacitance varies according to, among other things, the distance between the electrodes. Thus, compression of an example capacitor structure causes a change in capacitance. The weight placed on the capacitor structure may be determined by measuring the change in capacitance that results from the compression of the capacitor structure.

One drawback to prior capacitive load sensors is that systems that utilize such structures are prone to inaccuracies because of various environmental factors. For example, a change in humidity is known to cause a corresponding change in the dielectric constant of a capacitor. When the dielectric constant of a capacitor changes, the capacitance changes. Thus, a system that uses the capacitor may see different capacitances for the same weight when measured at different times and in environments having different humidities. Problems may arise if the system is not designed to address such variations.

To compensate for different environmental conditions, sensors must be isolated from such environmental conditions, or systems utilizing such sensors must be designed to account for fluctuations in the environment. Both approaches add to the cost of such devices and systems.

Recently, charge transfer sensors have been found to be useful for sensing touch and proximity. Other applications include fill-level sensing, position sensing, material analysis, and various other applications. Generally, a charge transfer sensor includes two capacitors. A first capacitor is charge to a fixed potential, then that charge is transferred to another known capacitor whose capacitance level is then measured. Through controlled switching and measurement of the transferred charge, a change in capacitance at the first capacitor can be measured.

Present charge transfer sensor designs do not appear to be directed to measuring a load, for example, the weight of a person or object. Furthermore, present capacitive load sensors may be expensive or prone to inaccuracies. Therefore, a charge transfer load sensor that addresses the above-identified deficiencies is desirable.

SUMMARY OF THE INVENTION

The present invention is a novel charge transfer load sensor having characteristics that are generally applicable to a myriad of applications where weight measurement is an objective. The invention also possesses characteristics that are applicable for air bag deployment systems for automobiles.

In a first embodiment, the invention is a charge transfer load sensor. The sensor comprises: an input port arranged to provide an input voltage; a first electrode coupled to the input port; a second electrode disposed a fixed distance from the first electrode and switchably coupled to the first electrode; a third electrode, arranged to couple to ground and movably disposed between the first and second electrodes, the third electrode movably responsive to a force; a switch arrangement arranged to apply a predetermined voltage level to the first electrode and couple the second electrode to ground during a first predetermined timing interval, and couple the first electrode to the second electrode during a second predetermined timing interval, whereby a first capacitor is formed between the first electrode and the third electrode, and a second capacitor is formed between the second electrode and the third electrode; and an output port coupled to the second electrode and arranged to provide an output voltage.

In a second embodiment, the invention is a charge transfer load sensor that comprises: a first switch having an input arranged to receive an input voltage and having an output; a first electrode coupled to the output of the first switch; a second switch having an input coupled the output of the first switch and having an output; a second electrode disposed a fixed distance from the first electrode and coupled to the output of the second switch; a third switch having an input coupled to the output of the second switch and an output arranged to couple to ground; a third electrode, arranged to couple to ground and movably disposed between the first and second electrodes, the third electrode movably responsive to a force; a switch control circuit coupled to the first, second and third switches and arranged to close the first and third switches and open the second switch during a first predetermined timing interval, and open the first and third switches and close the second switch during a second predetermined timing interval, whereby a first capacitor is formed between the first electrode and the third electrode, and a second capacitor is formed between with the second electrode and the third electrode; and an output port coupled to the second electrode arranged to provide an output voltage.

In another embodiment, the charge transfer load sensor, comprises: a first member having first and second sides and a hole extending therethrough; a first electrode disposed on the second side of the first member; an input port coupled to the first electrode and arranged to provide an input voltage; a second member having first and second sides; a second electrode disposed on the first side of the second member and switchably coupled to the first electrode; an output port coupled to the second electrode and arranged to provide an output voltage; a center member having a first side and a second side, the first side of the center member attached to the second side of the first member, and the second side of the center member attached to first side of the second member, the center member having a flexible portion disposed between the first and second members and shaped to have gaps between the flexible portion and the first and second members, and a conductive portion engaging the flexible portion and arranged to couple to ground, whereby the conductive portion is movable between the first and second electrodes; a rod extending through the hole of the first member and engaging the conductive portion of the center member; a switch arrangement arranged to apply a predetermined voltage level to the first electrode and couple the second electrode to ground during a first predetermined timing interval, and couple the first electrode to the second electrode during a second predetermined timing interval.

An air bag dispensing system that senses the weight of an occupant of a vehicle is another embodiment of the invention. The system comprises: a controller; a plurality of charge transfer load sensors coupled to the controller, each charge transfer load sensor including an input port arranged to provide an input voltage; a first electrode coupled to the input port; a second electrode disposed a fixed distance from the first electrode and switchably coupled to the first electrode; a third electrode, arranged to couple to ground and movably disposed between the first and second electrodes, the third electrode movably responsive to a force; a switch arrangement arranged to apply a predetermined voltage level to the first electrode and couple the second electrode to ground during a first predetermined timing interval, and couple the first electrode to the second electrode during a second predetermined timing interval, whereby a first capacitor is formed between the first electrode and the third electrode, and a second capacitor is formed between the second electrode and the third electrode; and an output port coupled to the second electrode and to the controller; a crash sensor coupled to the controller and arranged to generate a crash signal under predetermined conditions; an air bag; an air bag actuator coupled to the controller and the air bag, and arranged to dispense the air bag responsive to an air bag dispensing signal from the controller; and the controller configured and arranged to detect output voltage levels from the load sensors and generate the air bag dispensing signal if the output voltage levels from the load sensors indicate that a weight of an occupant exceeds a predetermined threshold.

A method for generating an output voltage in response to a force is provided in another embodiment. The method comprises the steps of: providing a first and second electrode a fixed distance apart; arranging a third electrode between the first and second electrode and coupling the third electrode to ground; moving the third electrode between the first and second electrode in response to the force; during a first timing interval, applying an input voltage to a first electrode and coupling the second electrode to ground; during a second timing interval, decoupling the first electrode from the input voltage and the second electrode from ground, and coupling the first electrode to the second electrode; and providing as output, voltage at the second electrode.

The above summary of the present invention is not intended to describe each disclosed embodiment of the present invention. The figures and detailed description that follow provide additional example embodiments and aspects of the present invention.

DETAILED DESCRIPTION

The present invention is believed to be applicable to a variety of arrangements for sensing the weight of an object, and believed to be particularly applicable to sensing the weight of a person occupying a seat in an automobile. While the present invention is not limited to such applications, an appreciation of various aspects of the invention will be gained through a discussion of various example embodiments provided below.

Figure 1:
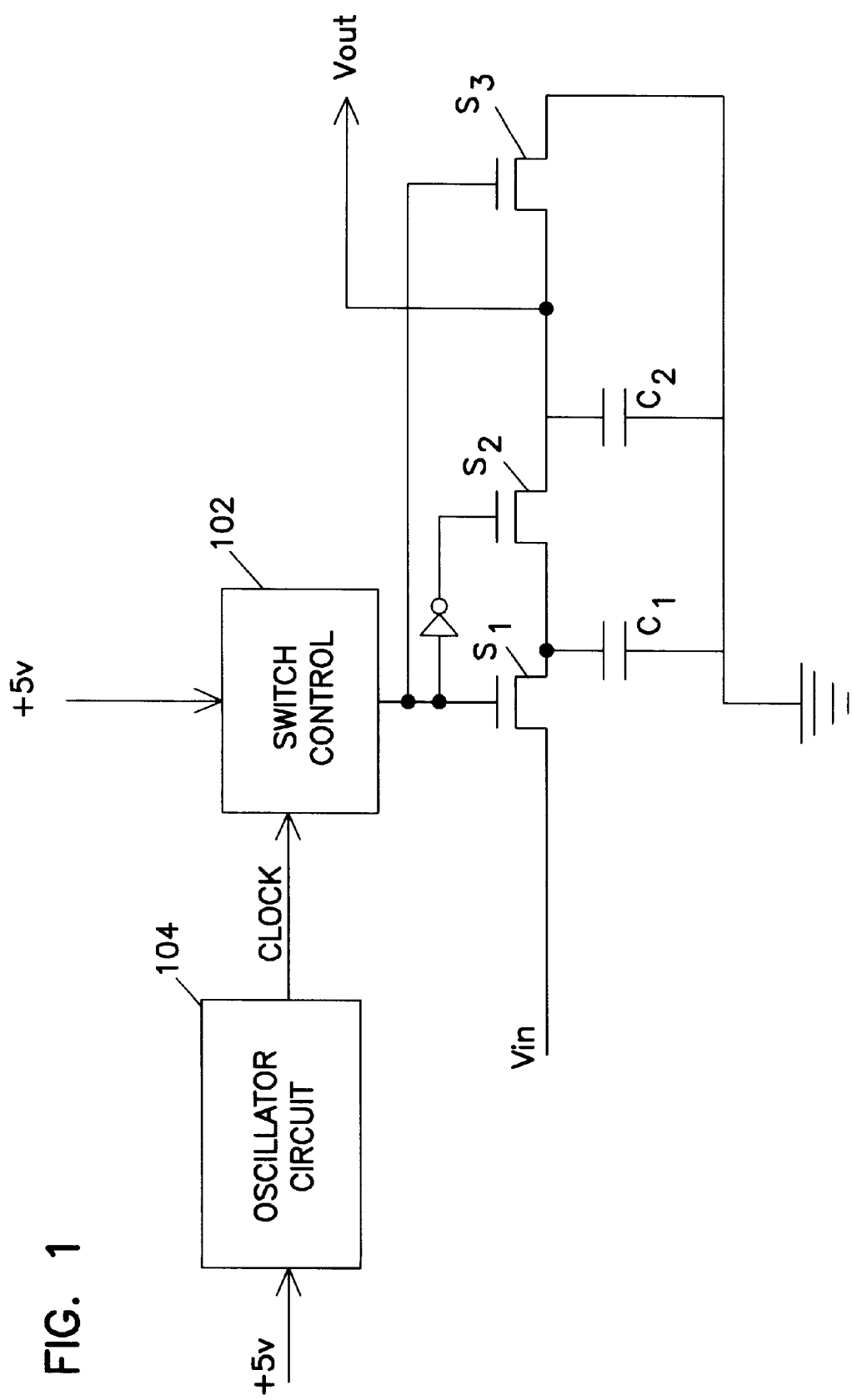
FIG. 1 is a circuit schematic of an example charge transfer circuit utilized in accordance with an example embodiment of the present invention.

FIG. 1 is a circuit schematic of an example charge transfer circuit utilized in accordance with the example embodiments of the present invention. The circuit includes capacitors $C_1$ and $C_2$, along with switches $S_1$, $S_2$, and $S_3$ for controlling the transfer of charge between capacitors $C_1$ and $C_2$.

The circuit of FIG. 1 uses the principle of conservation of charge between capacitors $C_1$ and $C_2$. Under the control of switch control circuit 102, switches $S_1$ and $S_3$ are closed, and switch $S_2$ is opened during a first predetermined timing interval. Oscillator circuit 104 provides a steady clock signal for sequencing the desired switching. When switches $S_1$ and $S_3$ are closed and $S_2$ is open, capacitor $C_1$ voltage goes to $V_{in}$ and capacitor $C_2$ goes to ground. In a second predetermined timing interval, switch control circuit 102 opens switches $S_1$ and $S_3$ and closes switch $S_2$. During this second predetermined timing interval, the charge on capacitor $C_1$ is transferred to capacitor $C_2$. Thus, the output voltage, $V_{out}$, is that which appears during the second predetermined timing interval at capacitor $C_2$.

In an alternative embodiment, switches $S_1$, $S_2$, and $S_3$ can be operated under microprocessor control.

Any of a variety of electronic components may be used to implement oscillator circuit 104 and switch control circuit 102. For example, a 4049 hex inverter may be used to output a pulse of approximately 12 kHz, and a 4066 device comprises switch control and CMOS switches S1, S2, and S3.

Figure 2:
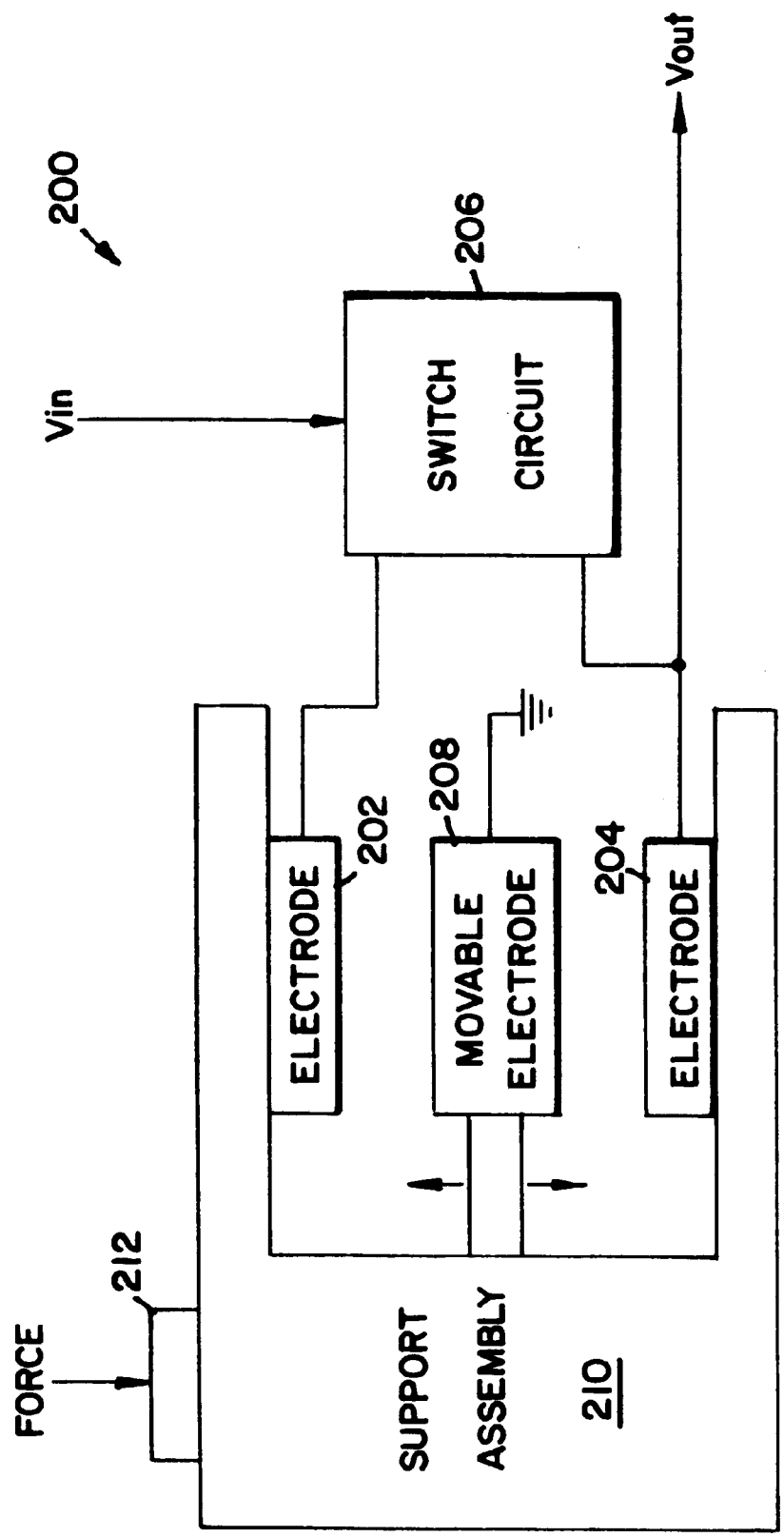
FIG. 2 is a pictorial block diagram of a charge transfer load sensor according to an example embodiment of the present invention.

FIG. 2 is a pictorial block diagram of a charge transfer load sensor according to an example embodiment of the present invention. The sensor 200 provides an output voltage, $V_{out}$, that is proportional to a force applied to sensor 200. Sensor 200 uses circuit principles as described in FIG. 1 and includes electrodes 202 and 204 that are coupled to switch circuit 206, along with a movable electrode 208 that is supported by support assembly 210.

Capacitors, for example, $C_1$ and $C_2$ of FIG. 1, are formed by electrodes 202, 204, and 208. Switch circuit 206 controls the input voltage, $V_{in}$, applied to electrode 202, along with the switching of coupling electrode 202 to electrode 204. Movable electrode 208 is coupled to ground and is movably responsive to a force applied to support assembly 210. Thus, the distance between movable electrode 208 and electrodes 202 and 204 varies in response to an applied force.

Many variations exist for implementing support assembly 210. However, the primary features of support assembly 210 include supporting electrodes 202 and 204 at a fixed distance one from the other, and supporting movable electrode 208 in a manner such that a force applied at member 212 translates to movement of electrode 208. It will be appreciated that electrodes 202 and 204 are insulated from ground. While support assembly 210 is shown as supporting electrodes 202 and 204, in an alternative embodiment, an additional support assembly that is separate from support assembly 210 could be utilized to support electrodes 202 and 204. Any of a number of mechanical support mechanisms may be utilized to translate a force to movement of electrode 208. For example, support assembly 210 may include a coil or leaf spring arrangement, an arrangement of elastic materials that may be stretched and/or compressed, or a hydraulic system.

Figure 3:
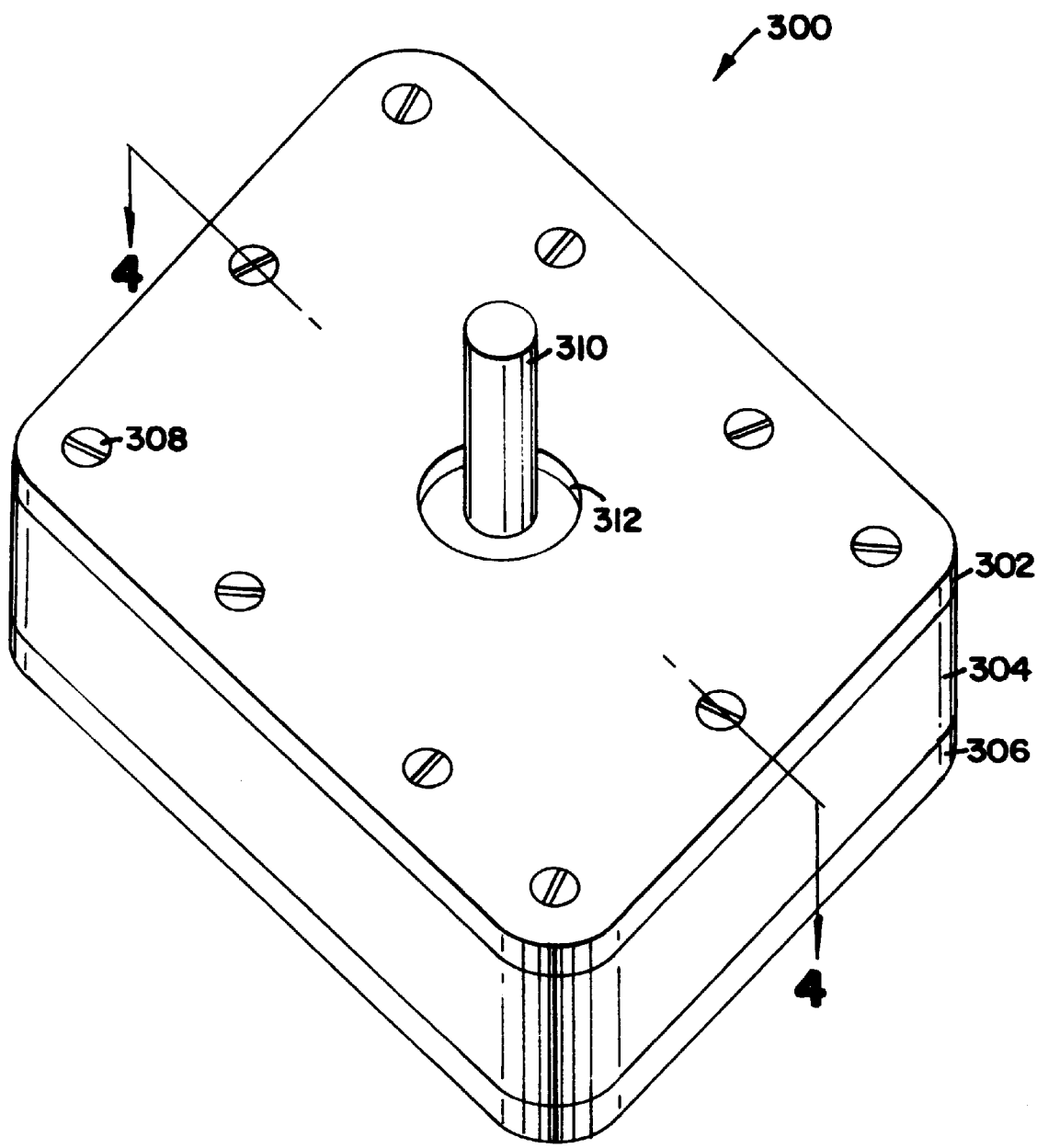
FIG. 3 is a perspective view of a capacitive load sensor according to an example embodiment of the present invention.

FIG. 3 is a perspective view of a capacitive load sensor according to an example embodiment of the present invention. Sensor 300 includes a first base plate 302, a center flexure plate 304, and a second base plate 306. Not all of the electronic components forming the charge transfer capacitors are visible in this perspective view. Relative to FIG. 2, electrode 202 is supported by first base plate 302, and electrode 204 is supported by second base plate 306. The movable electrode 208 of FIG. 2 is provided by center flexure plate 304. The following figures provide a better view of center flexure plate 304.

In the example embodiment, load sensor 300 is constructed from aircraftgrade aluminum, and plates 302, 304, and 306 are secured with a plurality of bolts 308.

Sensor 300 includes a rod or stud 310 upon which a force to be measured is exerted. Rod 310 extends through hole 312 formed in plate 302 and engages center flexure plate 304. The portion of center flexure plate 304 that is engaged by rod 310 comprises the movable electrode 208, for example. Therefore, force applied to rod 310 causes the movable electrode 208 of center flexure plate 304 to deflect from an electrode supported by plate 302.

The dimensions and materials used to form sensor 300 may vary according to particular applications. In an example application where there are four sensors 300 used to support an automobile seat, first base plate 302 is approximately 3½"×3"×1/10" thick. Center flexure plate 304 has the same length and width dimensions of first base plate 302 and is approximately 3/8" thick. Second base plate 306 has the same length and width dimensions and is approximately 1/4" thick.

Figure 4:
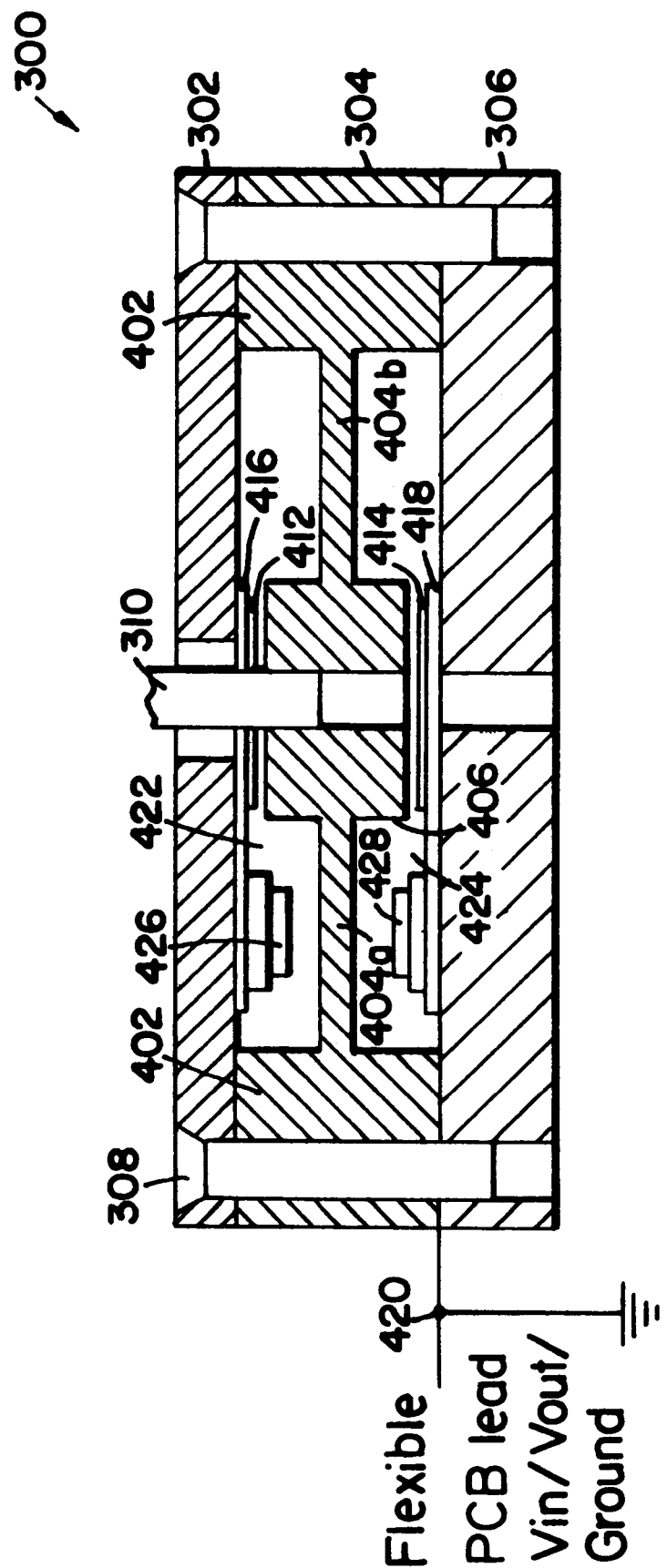
FIG. 4 is a cross-sectional view of the capacitive load sensor of FIG. 3 taken generally along line 4—4.

FIG. 4 is a cross-sectional view of sensor 300 taken in the direction of arrow 4 of FIG. 3. The view of FIG. 4 shows features of center flexure plate 304 that are hidden in the perspective view of FIG. 3. Center flexure plate 304 includes an outer support portion 402 that is secured to first base plate 302 and second base plate 306. Flexible support members 404a and 404b extend from support portion 402 of center flexure plate 304. A center electrode portion 406 is formed between support members 404a and 404b. Note that in the example embodiment, center flexure plate 304 is a monolithic structure of machined aircraft aluminum. Electrode portion 406 is grounded by virtue of its metallic construction and grounding of sensor 300.

Electrodes 412 and 414 are disposed on printed circuit boards 416 and 418, respectively. In an example embodiment, circuit boards 416 and 418 are flexible printed circuit boards of polyamide construction and are copper clad. Electrodes 412 and 414 are comprised of copper depositions on circuit boards 416 and 418 and include a dielectric cover coat deposited thereon to protect from short circuits. A lead portion 420 of flexible printed circuit board 418 is disposed between center plate 304 and base plate 306. The lead portion includes traces (not shown) for voltage-in ($V_{in}$), voltage-out ($V_{out}$), and ground. Note that the distances separating electrode portion 406 of center flexure plate 304 and electrodes 412 and 414 are small to yield a larger signal.

Cavities 422 and 424 are formed by machining support member 404a in center flexure plate 304 and are used in the example embodiment for housing example surface mount devices 426 and 428. Such example surface mount devices 426 and 428 are mounted on circuit boards 416 and 418, respectively, and are used to implement switch circuit 206, for example. A suitable glue is used to secure printed circuit board 416 and 418 to first base plate 302 and second base plate 306, respectively.

Figure 5:
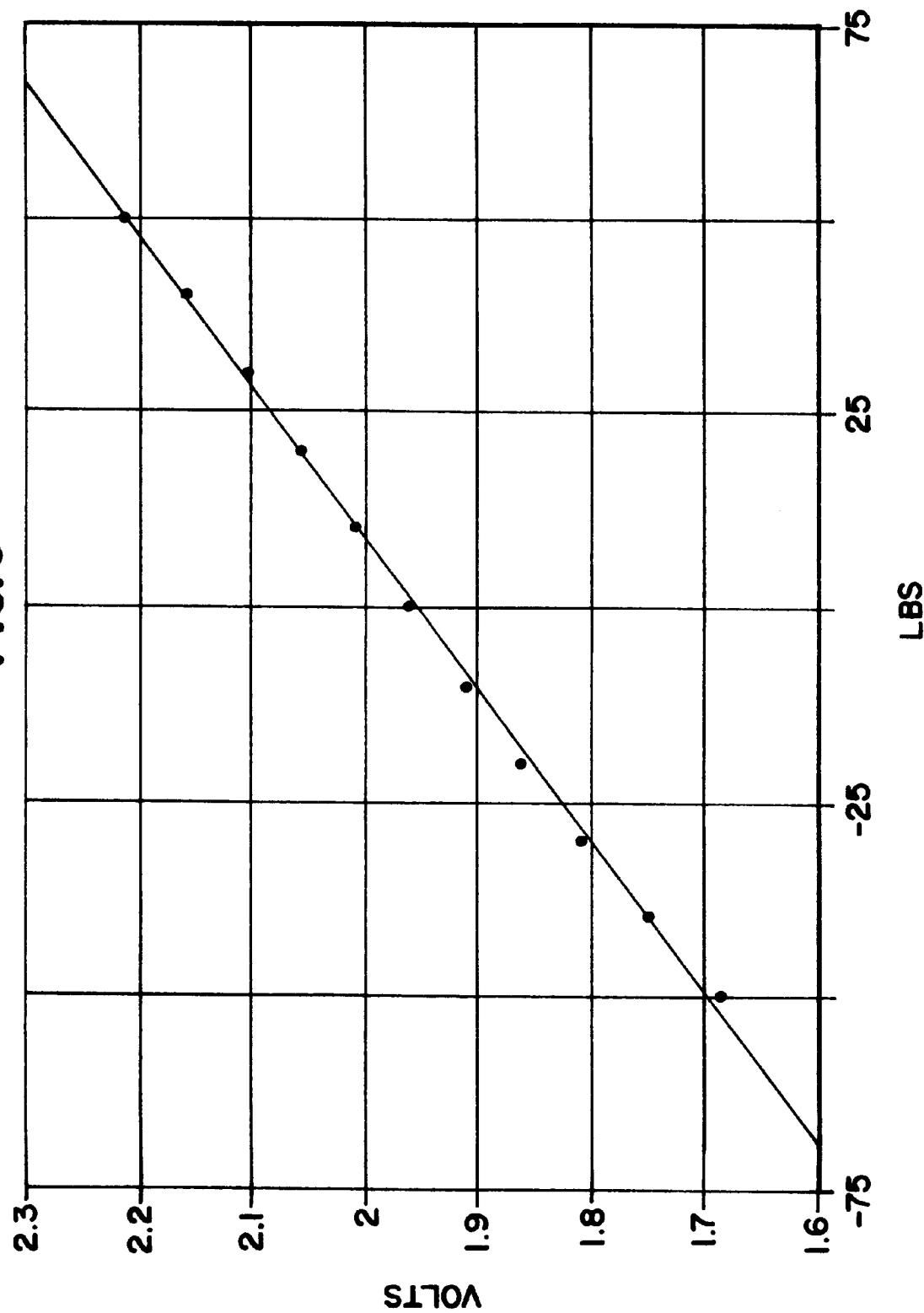
FIG. 5 is a graph showing example output voltage readings taken from the example capacitive load sensor of FIG. 3 for weights ranging from approximately −50 pounds to approximately +50 pounds.

FIG. 5 is a graph showing example output voltage readings taken from example sensor 300 for weights ranging from approximately −50 pounds to approximately +50 pounds. As shown in the figure, the output voltage is essentially a linear function of the force applied to rod 310. It will be appreciated that because electrodes 412 and 414, and center electrode portion 406 are essentially in the same environment, environmental changes that affect the capacitor formed by electrodes 412 and 406 similarly affect the capacitor formed by electrodes 414 and 406. Thus, the linear relationship between the applied force and the output voltage is preserved.

The following discussion illustrates that where the distance between two electrodes is fixed, for example, electrodes 202 and 204 of FIG. 2, the output voltage is a linear function of the distance separating them from the grounded electrode 208. The output voltage, $V_{out}$, can be calculated as follows, where, $C_1$ is the capacitance of capacitor $C_1$; $C_2$ is the capacitance of capacitor $C_2$; and $Q_{C1}$ is the charge on capacitor $C_1$:

$$V_{out} = Q_{C1}/(C_1+C_2) \text{ and}$$

$$Q_{C1} = C_1 V_{in}, \text{ thus,}$$

$$V_{out} = V_{in} C_1/(C_1+C_2)$$

By fixing the distance between electrodes 202 and 204, for example, and constructing support assembly 210 to provide a displacement of movable electrode 208 that is linearly related to an applied force, $V_{out}$ is thereby linearly related to the applied force, as illustrated below.

Recall that, $$V_{out} = V_{in} C_1/(C_1+C_2)$$

If C is the capacitance of a capacitor, K is a function of the dielectric constant and area of the capacitor, and D is the distance separating the charged electrode and grounded electrode of a capacitor, then, $$C = K/D$$

If $D_1$ is the distance between electrode 202 and movable electrode 208, and $D_2$ is the distance between electrode 204 and electrode 208, then $$V_{out} = V_{in}(K/D_1)/(K/D_1+K/D_2)$$

$$V_{out} = V_{in}(K/D_1)/(K/D_1+K/D_2)*K/K$$

$$V_{out} = (V_{in}/D_1)/(1/D_1+1/D_2)$$

If we assume that the fixed distance between electrodes 204 and 206 is G, then $V_{out}$ can be shown to be a linear function of G, $V_{in}$, and $D_1$. For purposes of discussion, assume that the thickness of movable electrode 208 is very small relative to G. It will be appreciated that for larger thicknesses, the linearity still applies.

$$G = D_1 + D_2$$

$$D_2 = G - D_1$$

Substituting for $D_2$, $$V_{out} = (V_{in}/D_1)/(1/D_1+1/(G-D_1))$$

$$V_{out} = (-V_{in}/G)D_1 + V_{in}$$

Therefore, it can be seen that $V_{out}$ is a linear function of the distance between movable electrode 208 and either of electrodes 202 or 204 because linear equations are of the form y=ax+b.

Figure 6:
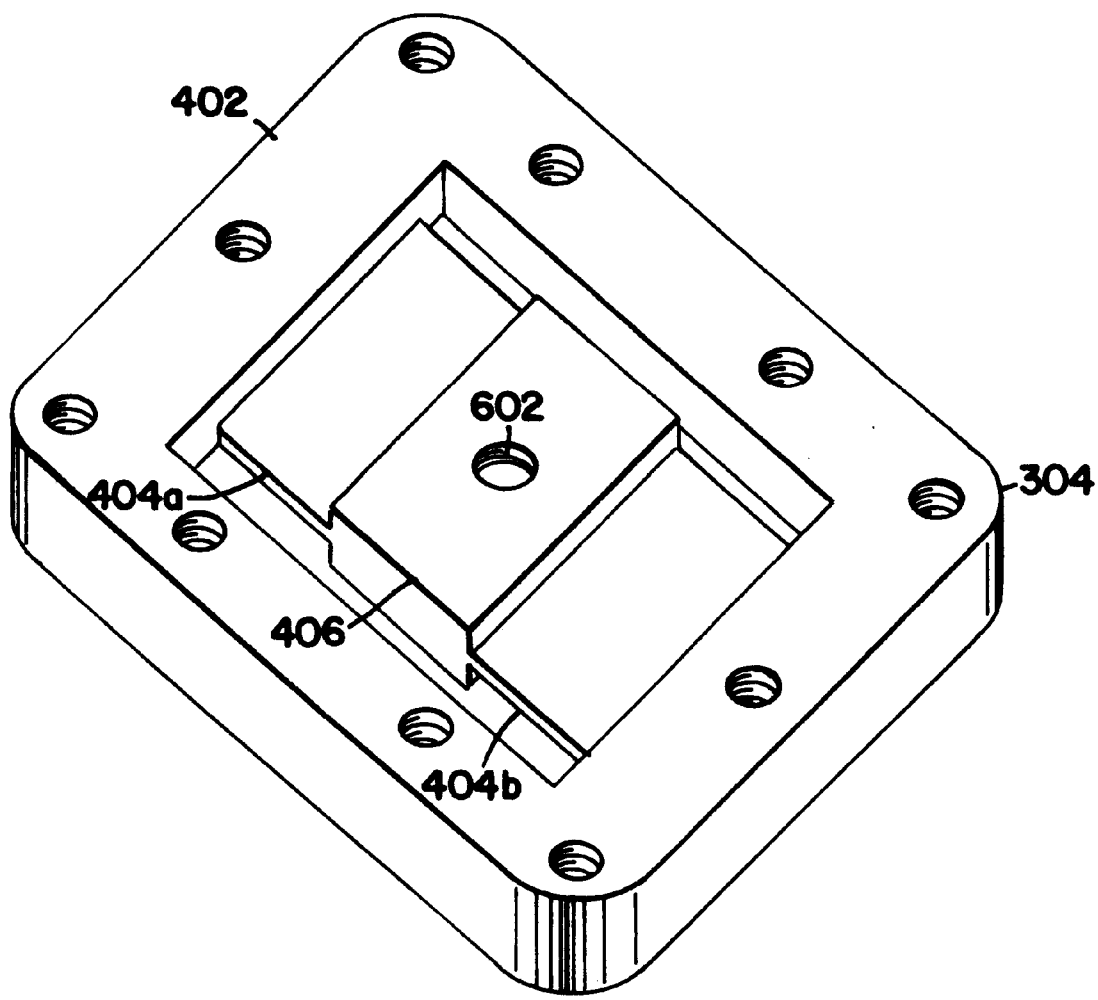
FIG. 6 is a perspective view of the center flexure plate of FIG. 3.

FIG. 6 is a perspective view of center flexure plate 304. As described above, center flexure plate 304 is a monolithic structure machined from aircraft-grade aluminum. Center flexure plate 304 is machined to form support portions 404a and 404b and electrode portion 406. In an example application where sensor 300 is one of four such sensors used in supporting that automobile seat, support portions 404a and 404b are identically sized. For example, each support portion 404a and 404b is approximately 1.25"×0.45"×0.045" thick, thus leaving a gap of approximately 0.1" between edges of support portions 404a and 404b and side walls 402 of center flexure plate 304. Electrode portion 406 is approximately 0.285" thick, and has opposing surface areas that are approximately 1.25"×1.0". Electrode portion 406 has a threaded hole 602 for engaging rod 310. In an alternative embodiment, rod 310 could be welded to electrode portion 406.

Figure 7:
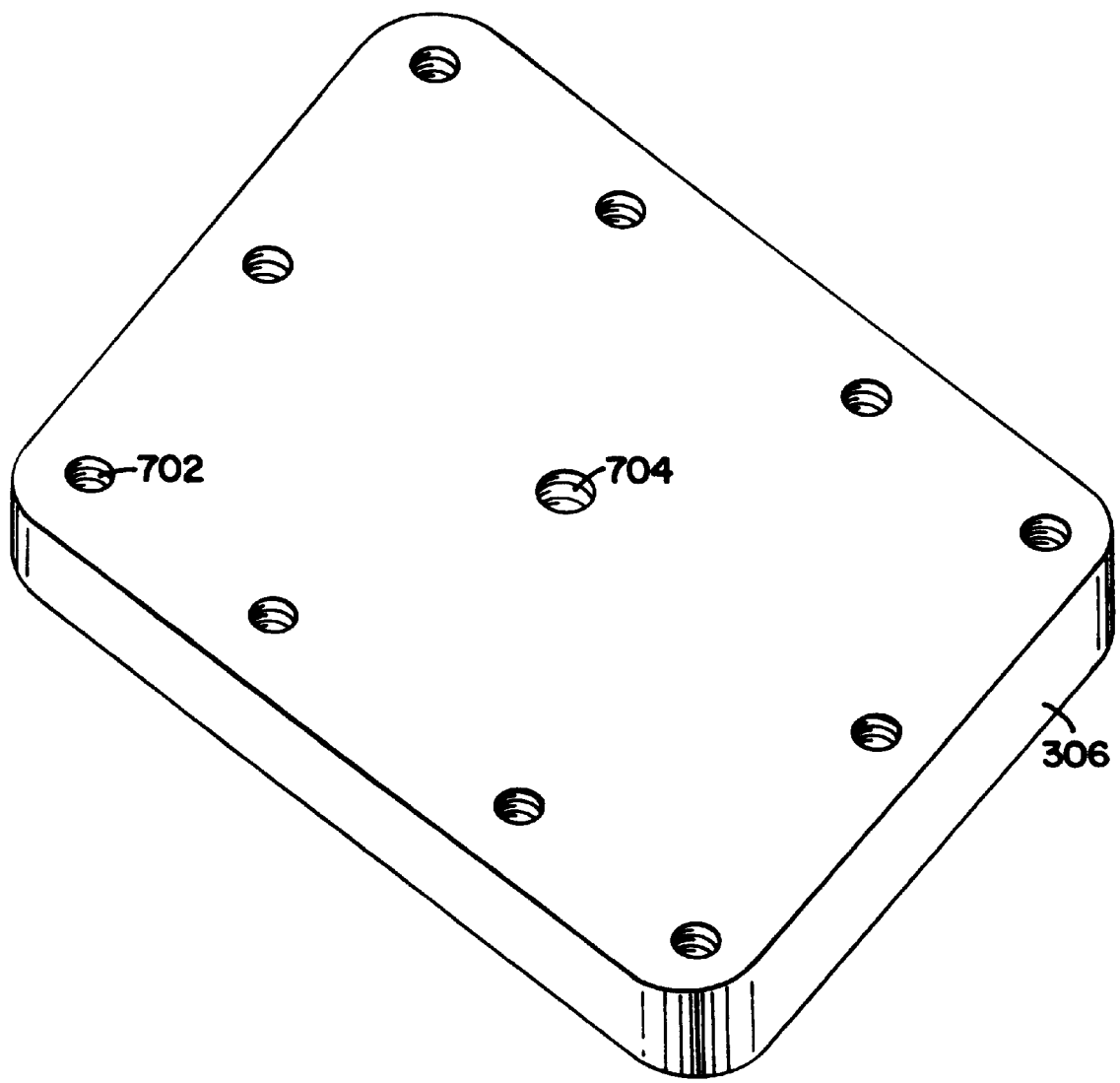
FIG. 7 is a perspective view of the second base plate of FIG. 3.

FIG. 7 is a perspective view of second base plate 306. Second base plate 306 includes a plurality of threaded holes for engaging bolts to secure to center flexure plate 304 and first base plate 302. A generally centered threaded hole 704 is included for mounting sensor 300 to another structure, such as the frame of an automobile.

Figure 8:
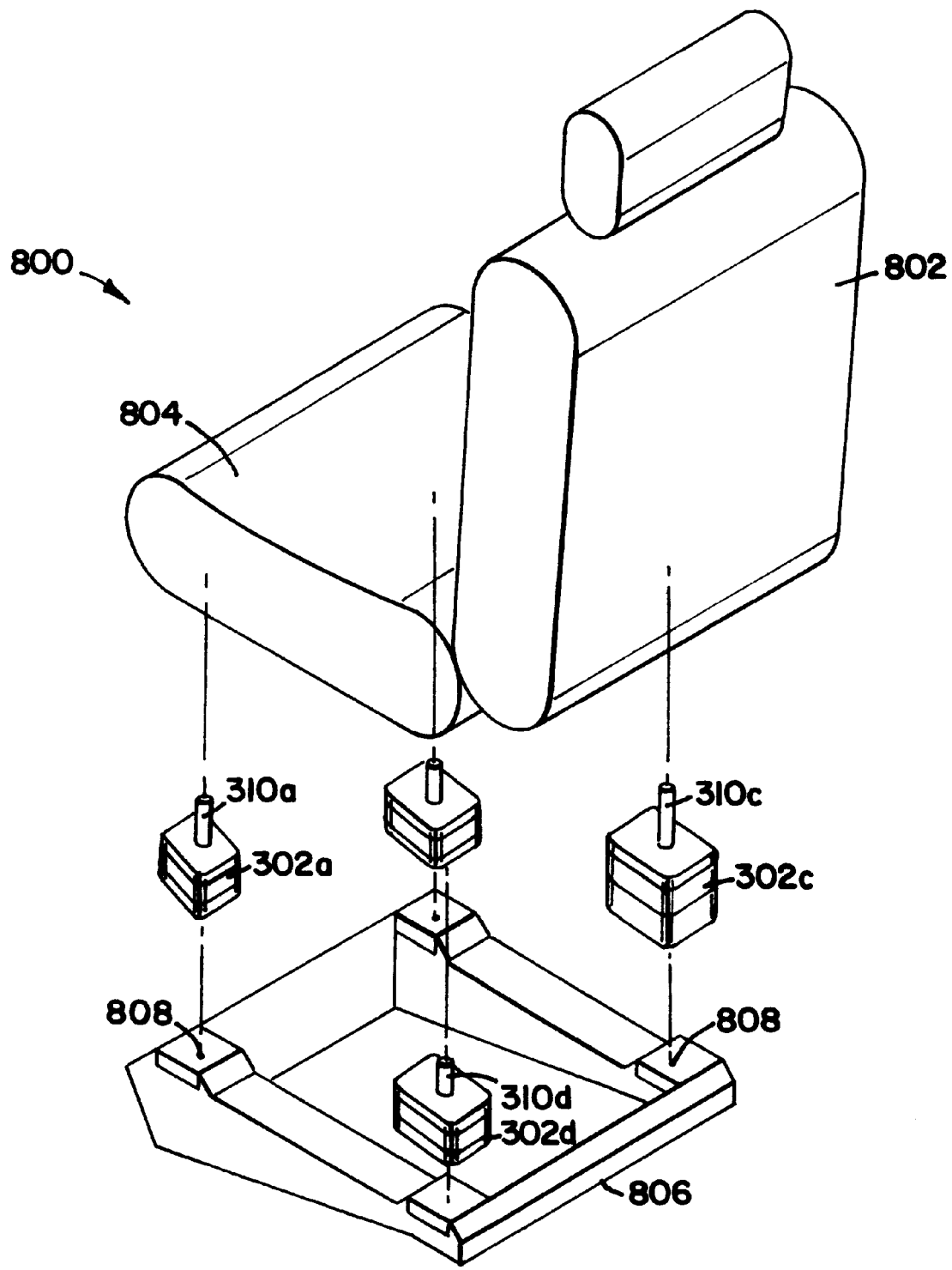
FIG. 8 illustrates a seat arrangement in accordance with another embodiment of the present invention.

FIG. 8 illustrates a seat arrangement 800 in accordance with another embodiment of the present invention. The seat arrangement 800 generally includes a seat back 802, a seat base 804, an underlying frame 806, and a plurality of charge transfer load sensors 302a, 302b, 302c, and 302d disposed between the seat base 804 and the underlying frame 806. Holes 808 extend into the underlying frame 806, proximate the four corners thereof, to receive bolts for engaging respective ones of sensors 302a–d. Current automobile industry practice is such that these seat bolts are typically secured in place with up to 5,000 pounds of force.

While not visible, it will be understood that seat base 804 includes assemblies for engaging respective ones of rods 310a, 310b, 310c, and 310d of sensors 302a–d, respectively. Thus, the weight of seat back 802, seat base 804, and a person sitting thereon is distributed among sensors 302a–d.

Seat arrangement 800 can be used in conjunction with a "smart" air bag dispensing system to assess the size of a passenger in the seat arrangement 800 and dispense the air bag accordingly. That is, if seat arrangement 800 is unoccupied or the weight of an occupant of seat arrangement 800 is less than a desired threshold weight, the air bag is not dispensed in collision. Sensors 302a–d are coupled to a controller (not shown), which in an example embodiment is part of an existing air bag dispensing system. After seat arrangement 800 has been installed, a reading is taken across each of sensors 302a–d and the results are stored in the controller to establish a point of reference. Note that some of the results read from sensors 302a–d may also be stored as the point of reference. When the ignition of the vehicle is "turned on," a reading is taken across each of the sensors 302a–d and the results, or the sum thereof, are compared to the point of reference. The difference between the current results and the initial results provide information regarding the weight of any occupant of seat arrangement 800 and thereby provides an indication of whether to dispense the air bag in the event of an accident.

Figure 9:
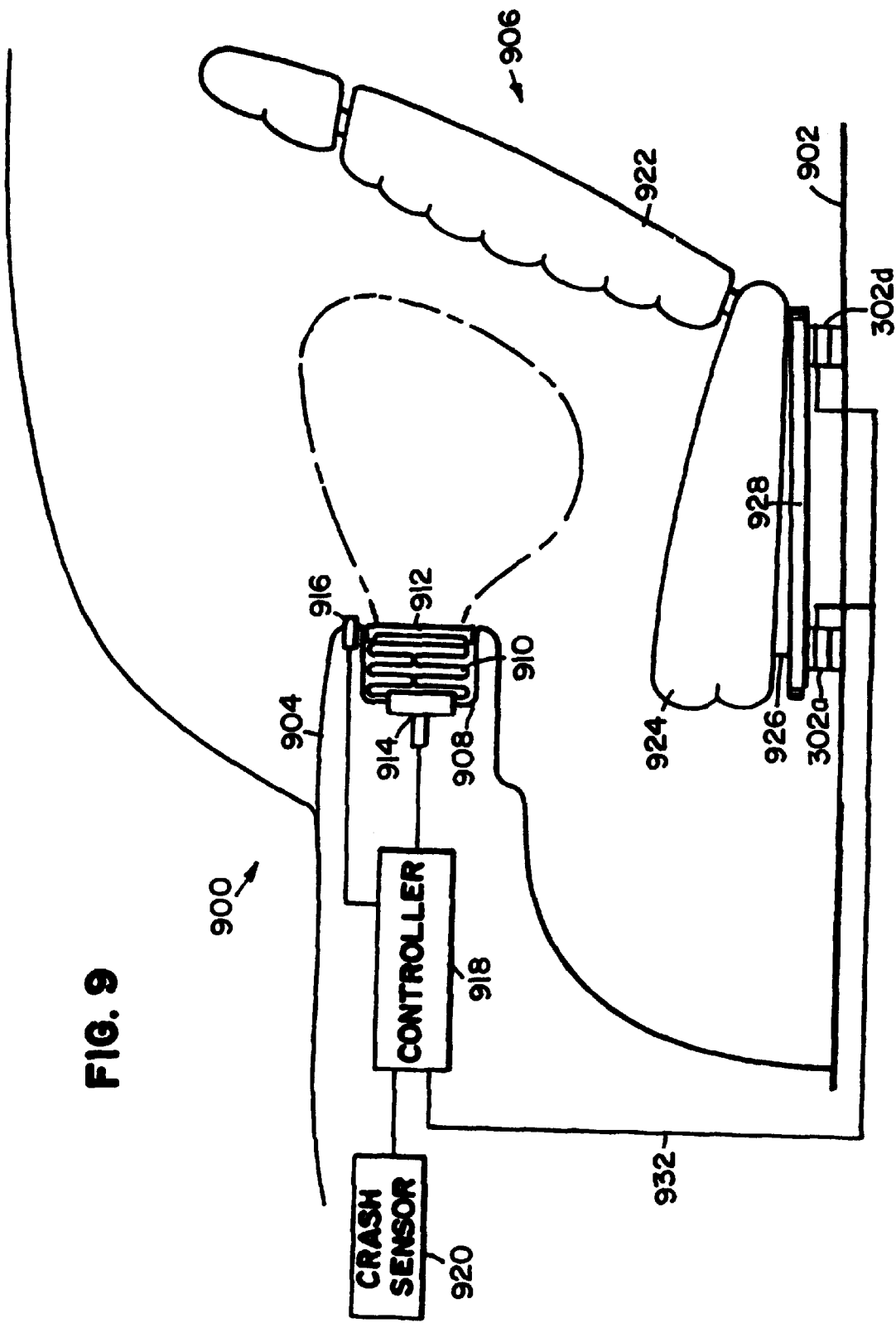
FIG. 9 shows an automobile and an air bag dispensing system configured in accordance with an example embodiment of the present invention.

FIG. 9 shows an automobile and an air bag dispensing system 900 configured in accordance with the present invention. The automobile generally includes a frame 902 underlying a dashboard 904 and a seat 906. A compartment 908 is provided in dashboard 904 to store a deflated air bag 910, and a cover 912 cooperates with compartment 908 to conceal the deflated air bag 910. An air bag actuator 914 is disposed within the dashboard 904 and coupled to the air bag 910. An error signal 916 is secured to the dashboard, as well. The actuator 914 and the signal 916 are both coupled to the controller 918. An impact sensor 920 is coupled to controller 918, as well. The actuator 914, sensor 920, and signal 916 all operate in a manner known in the art and cooperate with controller 918 to dispense the air bag 910 under certain circumstances.

The seat generally includes a seat back 922, a seat base 924, a slider mechanism 926 and 928, and a plurality of load sensors 302a–d disposed between the slider mechanism 926 and 928 and the vehicle frame 902. The seat base 924 is secured to the upper portion 926 of the slider mechanism, and the lower portion 928 of the slider mechanism is secured to the vehicle frame 902. By means known in the art, the upper portion 926 selectively slides relative to the lower portion 928 to allow adjustment of the distance between seats 906 and the dashboard 904. The charge transfer load sensors 302a–d are connected to controller 918 by means of wires 932. In an alternate embodiment, sensors 302a–d may be disposed between seat base 924 and slider portion 926 rather than between slider portion 928 and frame 902.

The various embodiments described above are provided by way of illustration only and should not be construed to limit the invention. Those skilled in the art will readily recognize various modifications and changes that may be made to the present invention without strictly following the example embodiment and applications illustrated and described herein, and without departing from the true spirit and scope of this invention, which is set forth in the following claims.

I claim:

1. A charge transfer load sensor, comprising:

an input port arranged to provide an input voltage;

a first electrode coupled to the input port;

a second electrode disposed a fixed distance from the first electrode and switchably coupled to the first electrode;

a third electrode, arranged to couple to ground and movably disposed between the first and second electrodes, the third electrode movably responsive to a force;

a switch arrangement arranged to apply a predetermined voltage level to the first electrode and couple the second electrode to ground during a first predetermined timing interval, and couple the first electrode to the second electrode during a second predetermined timing interval, whereby a first capacitor is formed between the first electrode and the third electrode, and a second capacitor is formed between the second electrode and the third electrode; and an output port coupled to the second electrode and arranged to provide an output voltage.

2. The sensor of claim 1, wherein the first electrode is approximately equal in size to the second electrode.

3. The sensor of claim 1, further comprising means for supporting the third electrode and translating a force to movement of the third electrode.

4. The sensor of claim 3, wherein movement of the third electrode is a linear function of the force.

5. The sensor of claim 1, further comprising a support assembly arranged to move the third electrode between the first and second electrodes responsive to a force.

6. The sensor of claim 5, wherein the first electrode is approximately equal in size to the second electrode.

7. A charge transfer load sensor, comprising:

a first switch having an input arranged to receive an input voltage and having an output;

a first electrode coupled to the output of the first switch;

a second switch having an input coupled the output of the first switch and having an output;

a second electrode disposed a fixed distance from the first electrode and coupled to the output of the second switch;

a third switch having an input coupled to the output of the second switch and an output arranged to couple to ground;

a third electrode, arranged to couple to ground and movably disposed between the first and second electrodes, the third electrode movably responsive to a force;

a switch control circuit coupled to the first, second and third switches and arranged to close the first and third switches and open the second switch during a first predetermined timing interval, and open the first and third switches and close the second switch during a second predetermined timing interval, whereby a first capacitor is formed between the first electrode and the third electrode, and a second capacitor is formed between with the second electrode and the third electrode; and an output port coupled to the second electrode arranged to provide an output voltage.

8. The sensor of claim 7, wherein the first electrode is approximately equal in size to the second electrode.

9. The sensor of claim 7, further comprising means for supporting the third electrode and translating a force to movement of the third electrode.

10. The sensor of claim 9, wherein movement of the third electrode is a linear function of the force.

11. The sensor of claim 7, further comprising a support assembly arranged to move the third electrode between the first and second electrodes responsive to a force.

12. The sensor of claim 11, wherein the first electrode is approximately equal in size to the second electrode.

13. A charge transfer load sensor, comprising:

a first member having first and second sides and a hole extending therethrough;

a first electrode disposed on the second side of the first member;

an input port coupled to the first electrode and arranged to provide an input voltage;

a second member having first and second sides;

a second electrode disposed on the first side of the second member and switchably coupled to the first electrode;

an output port coupled to the second electrode and arranged to provide an output voltage;

a center member having a first side and a second side, the first side of the center member attached to the second side of the first member, and the second side of the center member attached to first side of the second member, the center member having a flexible portion disposed between the first and second members and shaped to have gaps between the flexible portion and the first and second members, and a conductive portion engaging the flexible portion and arranged to couple to ground, whereby the conductive portion is movable between the first and second electrodes;

a rod extending through the hole of the first member and engaging the conductive portion of the center member;

a switch arrangement arranged to apply a predetermined voltage level to the first electrode and couple the second electrode to ground during a first predetermined timing interval, and couple the first electrode to the second electrode during a second predetermined timing interval.

14. The sensor of claim 13, further comprising:

a first switch having an input arranged to receive an input voltage and having an output coupled to the first electrode;

a second switch having an input coupled the output of the first switch and having an output coupled to the second electrode; and a third switch having an input coupled to the output of the second switch and an output arranged to couple to ground.

15. The sensor of claim 13, further comprising a printed circuit board upon which the first and second electrodes are disposed.

16. The sensor of claim 13, wherein the printed circuit board is a flexible printed circuit board.

17. The sensor of claim 13, wherein the first electrode is approximately equal in size to the second electrode.

18. The sensor of claim 13, further comprising means for supporting the third electrode and translating a force to movement of the third electrode.

19. The sensor of claim 18, wherein movement of the third electrode is a linear function of the force.

20. The sensor of claim 13, further comprising a support assembly arranged to move the third electrode between the first and second electrodes responsive to a force.

21. The sensor of claim 20, wherein the first electrode is approximately equal in size to the second electrode.

22. An air bag dispensing system that senses the weight of an occupant of a vehicle, comprising:

a controller;

a plurality of charge transfer load sensors coupled to the controller, each charge transfer load sensor including an input port arranged to provide an input voltage;

a first electrode coupled to the input port;

a second electrode disposed a fixed distance from the first electrode and switchably coupled to the first electrode;

a third electrode, arranged to couple to ground and movably disposed between the first and second electrodes, the third electrode movably responsive to a force;

a switch arrangement arranged to apply a predetermined voltage level to the first electrode and couple the second electrode to ground during a first predetermined timing interval, and couple the first electrode to the second electrode during a second predetermined timing interval, whereby a first capacitor is formed between the first electrode and the third electrode, and a second capacitor is formed between the second electrode and the third electrode; and an output port coupled to the second electrode and to the controller;

a crash sensor coupled to the controller and arranged to generate a crash signal under predetermined conditions;

an air bag;

an air bag actuator coupled to the controller and the air bag, and arranged to dispense the air bag responsive to an air bag dispensing signal from the controller; and the controller configured and arranged to detect output voltage levels from the load sensors and generate the air bag dispensing signal if the output voltage levels from the load sensors indicate that a weight of an occupant exceeds a predetermined threshold.

23. A method for generating an output voltage in response to a force, comprising the steps of:

provifing a first and second electrode a fixed distance apart;

arranging a third electrode between the first and second electrode and coupling the third electrode to ground;

moving the third electrode between the first and second electrode in response to the force;

during a first timing interval, applying an input voltage to a first electrode and coupling the second electrode to ground;

during a second timing interval, decoupling the first electrode from the input voltage and the second electrode from ground, and coupling the first electrode to the second electrode; and providing as output, voltage at the second electrode.

* * * * *